(12) United States Patent
Thomas

(10) Patent No.: US 6,781,623 B1
(45) Date of Patent: Aug. 24, 2004

(54) VERTICAL COMPENSATION IN A MOVING CAMERA

(75) Inventor: David Thomas, Opio (FR)

(73) Assignee: Texas Instruments Incorporated, Dallas, TX (US)

( * ) Notice: Subject to any disclaimer, the term of this patent is extended or adjusted under 35 U.S.C. 154(b) by 107 days.

(21) Appl. No.: 09/615,117

(22) Filed: Jul. 13, 2000

(30) Foreign Application Priority Data

Jul. 19, 1999 (EP) .......................................... 99401815

(51) Int. Cl.[7] .......................................... H04N 5/228
(52) U.S. Cl. .......................... 348/208.4; 348/208.99; 348/208.1; 348/208.5; 348/208.6
(58) Field of Search .................. 348/208.99, 208.1, 348/208.2, 208.4, 208.5, 208.6, 208.7; 345/649, 651, 655, 656, 657; 382/293, 294, 295, 296

(56) References Cited

U.S. PATENT DOCUMENTS

| | | | | |
|---|---|---|---|---|
| 5,060,074 A | * | 10/1991 | Kinugasa et al. | 348/208.6 |
| 5,093,653 A | * | 3/1992 | Ikehira | 345/657 |
| 5,227,889 A | * | 7/1993 | Yoneyama et al. | 348/208.6 |
| 5,446,803 A | * | 8/1995 | Kunitake et al. | 382/290 |
| 5,465,304 A | * | 11/1995 | Cullen et al. | 382/176 |
| 5,485,504 A | | 1/1996 | Ohnsorge | 379/58 |
| 5,901,253 A | * | 5/1999 | Tretter | 382/289 |
| 5,910,815 A | | 6/1999 | Boursier et al. | 348/14 |
| 5,973,733 A | * | 10/1999 | Gove | 348/208.13 |
| 5,973,738 A | * | 10/1999 | Srivastava | 348/395.1 |
| 6,011,585 A | * | 1/2000 | Anderson | 348/272 |
| 6,043,837 A | * | 3/2000 | Driscoll et al. | 348/36 |
| 2002/0063779 A1 | * | 5/2002 | Kaneda et al. | 348/208 |

FOREIGN PATENT DOCUMENTS

| | | | | |
|---|---|---|---|---|
| DE | 197 26 602 A1 | 1/1998 | | H04M/1/00 |
| EP | 0 456 414 A2 | 11/1991 | | H04N/5/217 |
| EP | 0 526 802 A2 | 2/1993 | | H04M/1/72 |
| EP | 0 884 905 A2 | 12/1998 | | H04M/1/00 |
| GB | 2 307 133 A | 5/1997 | | H04N/5/232 |
| GB | 2315 186 A | 1/1998 | | H04M/1/02 |
| JP | 58222382 A | * 12/1983 | | G06K/9/36 |

* cited by examiner

*Primary Examiner*—Andrew Christensen
*Assistant Examiner*—Brian Genco
(74) *Attorney, Agent, or Firm*—Robert D. Marshall, Jr.; W. James Brady, III; Frederick J. Telecky, Jr.

(57) ABSTRACT

A hand-held device comprising a housing (10) shaped and dimensioned to allow the device to be hand held, a display (12) secured to the housing for displaying moving pictures on a frame-by-frame basis, and a camera (16, 18) having an optical axis (O) extending generally away from the display to image a person who is viewing the display. The hand-held device further comprises a sensor (20) configured to determine a rotational angle between an alignment axis (V) of the hand-held device and a reference alignment axis in real space. Alternative embodiments use a reference alignment axis obtained on the basis of data content of the images, as determined by image processing techniques. In this way, subjective picture quality can be improved by compensating for vertical mis-alignment of the image content of the frames obtained by the camera.

8 Claims, 3 Drawing Sheets

VERTICAL COMPENSATION IN A MOVING CAMERA

The invention relates to image processing, more especially to a method of and apparatus for processing motion picture images taken with a moving camera such as a hand-held camera, or a hand-held terminal device including a camera.

BACKGROUND OF THE INVENTION

In the future, there is likely to be considerable demand for telephones with a multi-media video and audio capability.

FIG. 1 of the accompanying drawings illustrates one possible design for a video telephone in the form of a hand-held terminal 14. The hand-held terminal has a main housing 10 to which is mounted a video display 12 and an antenna 26. The display is provided for showing moving picture images received by the terminal from a wireless transmission to the antenna 26. A camera 16 and 18 for taking images is built into the housing 10. The camera is provided to take a sequence of image frames and to supply them to the antenna 26 for wireless transmission to a base station. The camera will most likely be a digital camera based on a charged coupled device (CCD) 16, or other array detector, and will have conventional lens optics 18, possibly in conjunction with optical fibre components. The camera will have an optical axis "O". In addition, there will be a notional vertical axis "V" of the terminal defined by vertical alignment of the display and camera. The alignment of the display 12 will be made to coincide with the alignment of the projection of the image viewed by the camera on the rectangular active area of the CCD chip 16. The antenna 26 may be a broad-band transceiver antenna 26, or some other antenna arrangement such as separate helical antennae for receiving and transmitting arranged within the housing 10. The main housing 10 will also comprise various keys or buttons for dialling and other functions, and have an in-built loudspeaker and microphone for the audio part of the signal. These components are not shown.

Consider a video telephone communication between two users, Janet and John. During the call, Janet will hold her terminal by one or two hands for comfortable viewing of John on the display. For Janet, whether or not she is holding her terminal at the correct orientation will be of secondary importance. However, for John, any mis-orientation of Janet's terminal will be a problem, since it will result in Janet's image being mis-oriented on the display of John's hand-held terminal. For John, this will be a nuisance and detract from his subjective evaluation of picture quality.

FIGS. 2 to 4 of the accompanying drawings illustrate the orientation problem.

FIG. 2 of the accompanying drawings illustrates Janet's image displayed on John's hand-held terminal with proper alignment of Janet's hand-held terminal relative to herself. The image is shown as a number of shaded objects, as would result from use of a standard such as MPEG-4. Janet is object 3, the remaining objects 1, 2 and 4 being background objects.

FIG. 3 of the accompanying drawings shows Janet's image as superimposed on the CCD chip 16 of her hand-held terminal, which is now being held by her tilted at an angle. More particularly, the vertical axis "V" of the hand-held terminal now extends at an angle θ to an axis "U" characteristic of Janet's image.

FIG. 4 of the accompanying drawings shows Janet's image as it appears on the display of John's hand-held terminal when Janet is holding her terminal as shown in FIG. 3. Thus, if John holds his terminal straight, Janet appears to be leaning over. John could re-align Janet's image by rotating his terminal, but this would affect his image as displayed on Janet's terminal. Reaction times and transmission lag could result in an unstable picture orientation if communicating parties attempt hand correction of the vertical alignment in this way.

More generally, in any application where there is a possibility of rotating a camera about its optical axis, the image taken by the camera will appear distorted in the perception of a viewer when displayed on a remote terminal. For example, a door or building will appear to be leaning over at an angle, or the horizon of a landscape will appear tilted.

Appreciation of this problem leads to the following conclusions for hand-held terminals comprising a display and a built-in video camera:

(i) It will be inconvenient and difficult for a user to hold a hand-held terminal so that his/her image aligns vertically with a vertical axis defined by the hand-held terminal's camera and display.

(ii) The vast majority of images of interest will have a preferred vertical alignment axis that will need to be aligned with a vertical axis of the transmitting user's hand-held terminal for maximum perceived picture quality on the receiving user's display.

It is therefore an object of the invention to provide a method and apparatus by which vertical mis-alignment of images taken with a hand-held camera device can be automatically corrected for.

SUMMARY OF THE INVENTION

According to a first aspect of the invention there is provided a hand-held device comprising a display for displaying moving pictures on a frame-by-frame basis and a camera having an optical axis extending generally away from the display to image a person who is viewing the display. The hand-held device further comprises a sensor configured to determine a rotational angle between an alignment axis of the hand-held device and a reference alignment axis in real space, and a signal processing circuit arranged to associate image frames taken by the camera with respective rotational angles determined by the sensor.

By associating each frame with a rotational angle reflecting vertical mis-alignment of the data content of the image, vertical mis-alignment can be corrected for by applying a rotational transform to the image frames, either in the hand-held device itself or subsequently.

In one embodiment, a digital signal processor is operatively arranged between the camera's detector and an output stage of the hand-held device so as to apply a rotational transform to each image frame taken by the camera prior to supply of that frame to the output stage.

In another embodiment, a digital signal processor is operatively arranged between an input stage of a terminal device and its display so as to apply a rotational transform to each image frame received by the input stage prior to supply to the display, the transform being a rotation of the image frame through an angle derived from the rotational angle associated with that frame which is supplied to the hand-held device with the image data device. In this embodiment, the terminal device may in fact not be a hand-held device, but could be a larger device such as a bulky projector, home video player or personal computer.

In a further embodiment, a digital signal processor for applying the rotational transform is arranged in a wireless base station used for relaying data between transceiver parties. The transform angle is derived from the rotational angle associated with that frame which is supplied to the base station with the image data by the transmitting party.

According to a second aspect of the invention there is provided an image processing apparatus, comprising a digital signal processor for processing a sequence of image frames by: (a) determining a vertical alignment axis for each frame of the sequence from an analysis of the data content of that frame; (b) applying a rotational transform to each frame to map the vertical alignment axis determined by the analysis onto a fixed alignment axis of the frame; and (c) outputting the sequence of image frames. This approach differs from that of the first aspect of the invention in that the vertical mis-alignment is determined from image processing of the data content of the image frames themselves, rather than by an independent measurement of a physical parameter, such as gravity, with a sensor.

In one embodiment, the image processing apparatus of the second aspect of the invention is provided in a hand-held device comprising a camera, the image processing apparatus being connected on an output side of the camera to apply rotational transformations to frames obtained by the camera, thereby to compensate for vertical misalignment of the data content of the frames.

In another embodiment, the image processing apparatus of the second aspect of the invention is provided in a video display device, the image processing apparatus being connected in the data path leading to the display, thereby to compensate for vertical misalignment of the data content of the frames supplied for display. The display device may be a personal computer, a hand-held video telephone, or a micro-mirror projector, for example.

In a further embodiment, a base station for wireless communication between a plurality of transceiver devices is equipped with an image processing apparatus according to the second aspect of the invention to compensate for vertical misalignment of the data content of the image frames received by the base station from a transmitting party prior to relaying the signal to a receiving party.

Further aspects of the invention are exemplified by the attached claims.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 5:
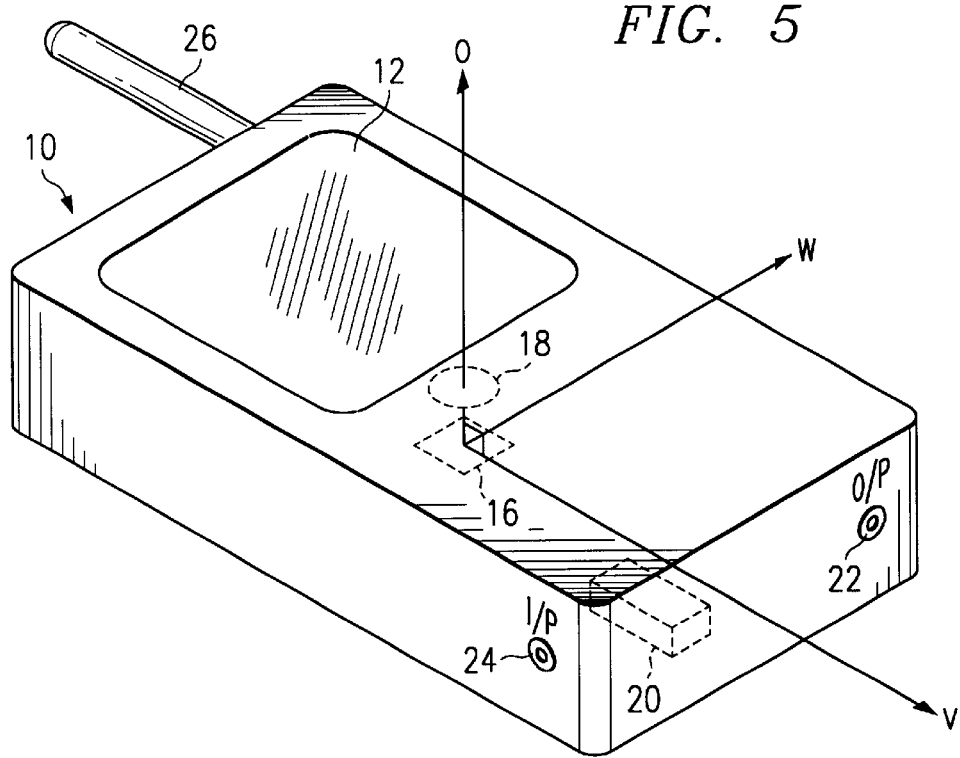
FIG. 5 is a perspective view of a video telephone in the form of a hand-held terminal comprising a display and in-built camera according to an embodiment of the invention.

FIG. 5 illustrates a hand-held device comprising a housing 10 shaped and dimensioned to allow the device to be hand-held. A display 12 is secured to the housing 10 and connected internally so as to display moving pictures on a frame-by-frame basis. Frame data is received through the wireless antenna 26 which is a broad-band antenna. Any other standard antenna, such as a helical antenna arranged in the housing 10 could also be used. A camera 16 and 18 is arranged in the housing 10 so as to define an optical axis "O" extending from the housing 10 in a direction from which the display 12 is viewable by a user. Preferably, the alignment is as shown in the drawing, with the optical axis "O" extending approximately at right angles to the plane of the display 12. More generally, it will be preferable to align the optical axis "O" to form an angle of close to 90° with an axis "W" extending laterally across the terminal, but the angle which the optical axis "O" forms with the notional vertical axis "V" of the terminal may be less than 90°, for example in the range 60 to 90°, to take account of a tendency to tilt the terminal slightly backwards when being held.

In any case, the optical axis "O" is directed so as best to image a user who is holding the hand-held terminal normally to view the display 12. An image of the user will thus be incident on the array detector 16 which comprises an array of light sensitive elements for obtaining respective pixels of an image frame.

The hand-held terminal further comprises a sensor 20 arranged in the housing 10. The sensor 20 is operable to determine the orientation of the hand-held terminal relative to its environment. More specifically, the sensor is configured to determine a rotational angle "θ" between the vertical alignment axis "V" of the hand-held device and a reference alignment axis "U" defined by a real space orientation. The angle "θ" is the angle between the axes "U" and "V" in the image plane of the camera, noting that both axes by definition extend in or parallel to the image plane. The reference alignment axis may for example be based on sensing the earth's gravitational field axis "G", i.e. vertical. The axes "G" and "U" are related in that the axis "U" is the projection of axis "G" onto the image plane of the camera. A similar relation will hold between any other real-space axis defined by sensor reading and the reference axis "U" in the image plane. It is also noted that the image plane of the camera will generally be co-planar with the plane of the CCD chip 16 if conventional optics are used, and also the plane of the display 12, although this may not be the case in all applications.

The sensor 20 may be a magneto-inductive sensor such as those used in automobile navigation systems, virtual reality head trackers and other applications. One commercially available sensor is made by Tri-M Systems of Canada and employs a single solenoid winding for each real-space axis, thereby to allow absolute sensing of alignment in all three dimensions. These sensors weigh only around one half of a gramme (0.02 ounces) and consume less than 1 mA of current. The magneto-inductive sensor can be used in combination with a digital signal processor or a dedicated signal processing circuit to compute the rotational angle "θ" between the alignment axis "V" and some convenient reference alignment axis in real space, such as an axis derived from measurement of the earth's magnetic field orientation. Also shown in FIG. 5 are an input socket 24 and an output socket 22 providing alternative routes for input and output of image data, additional to the antenna 26.

Figure 6:
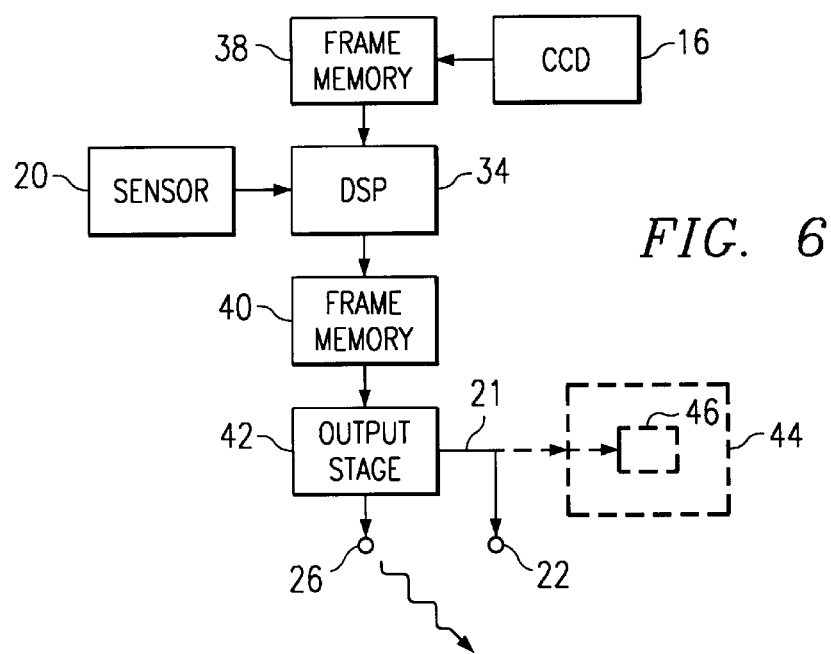
FIG. 6 is a block diagram showing internal structure of the video telephone of FIG. 5.

FIG. 6 is a block diagram showing the inter-relationship between elements of the hand-held terminal illustrated in FIG. 5. The CCD-chip 16 is arranged to read out into a first frame memory 38. The first frame memory 38 has the capacity to store at least one image frame at a time, preferably several image frames. The hand-held terminal further comprises a digital signal processor (DSP) 34 operative to apply a rotational transform to an image frame held in the first frame memory 38 and to write the transformed image frame into a second frame memory 40. The second frame memory 40 has the capacity to store at least one image frame at a time, preferably several image frames.

The rotational transform performs rotation of the image through an angle derived from the output of the sensor 20.

It will be appreciated that in a real-time application such as video telephony there will be no need to store the sensor readings, since the time lag between when an image frame is taken by the CCD and when it is transformed will effectively be fixed by the frame rate. For example, if the frame rate is 30 per second then the time lag between taking the frame and processing it will be a fixed small integer multiple of 1/30 second, depending on the amount of buffering by the first frame memory 38. All that is needed is similar buffering of the sensor readings obtained from the sensor 20 to provide the same amount of delay. However, in other applications there may be a significant and variable time lag between taking the images and processing them in which cases the sensor readings will need to be stored, for example in a look-up table, and the image frames will require a time stamp. When performing the processing, the DSP can then refer to the look-up table using the time stamp of the image frame to be transformed.

Moreover, the CCD chip 16 is preferably oversized relative to the desired output frame. This will allow image rotation to take place within a certain angular range, for example within 20 degrees from vertical, without areas in the image plane that lie beyond edges of the active area of the CCD chip 116 being mapped onto the output frame. Alternatively, auto-enlargement techniques could be used to avoid loss of signal content at the peripheries of the output frames, with the enlargement factor being determined by the amount of rotation.

Transformed image frames are read out from the second frame memory 40 into an output stage 42. The output stage 42 leads in turn to the antenna 26 through a wireless transmitter. Output may also take place through an electrical or optical communication line 21 leading to the output socket 22.

One method by which the rotational transform can be performed is to calculate a new pixel address using the coordinates of the corners of a triangle where the sides that are separated by the mis-alignment angle θ are of equal length. The coordinates of the corners of the triangles opposite to the angle θ represent the old and new coordinates for the pixel concerned. This relocation of pixels is repeated pixel by pixel over the frames to be corrected with the new pixel addresses being written into the second frame memory 40 and the old pixel addresses being read from the first frame memory 38.

Another method by which the rotational transform can be performed is based on block transformation of visual or audio-visual objects in an encoded video signal, such as in MPEG-4. In the language of MPEG-4, tools, algorithms and profiles can be developed and defined which allow for rotational transformation on a frame-by-frame basis. In the case of video telephone, rotational transformation could be confined to the audio-visual object or objects forming the subject person, with a synthetic background being substituted for the real background.

FIG. 6 also shows in dotted lines a drive 44 connected to the communication line 21 from the output stage 42. The drive 44 is mounted in the housing 10 and includes a removable data carrier 46. The removable data carrier could be a digital audio tape or optical disc. The sequence of images stored on the data carrier 46 could also be viewable on the display 12 through a playing function of the hand-held terminal. Alternatively, the data carrier 46 could be a fixed data carrier such as a memory, e.g. a non-volatile solid state memory, and the drive 44 could be omitted. If a data carrier of this kind were included, a sequence of images taken by the camera could be stored in the hand-held terminal for later read out through the output 22.

Moreover, for an application such as a video camera recorder (camcorder), the display 12 could be omitted altogether, as could the wireless components such as the wireless transmitter and antenna 26.

Figure 7:
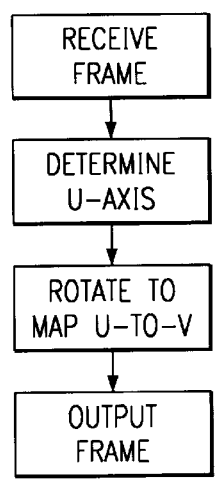
FIG. 7 is a flow diagram of operation of the video telephone of FIG. 6 to correct for vertical mis-alignment in the images.

FIG. 7 is a flow diagram showing operation of the DSP 34 to compensate for vertical mis-alignment of the data content of the image frames. The DSP 34 is configured to process the frames taken by the CCD chip 16 by determining a vertical alignment axis for each frame of the sequence. A rotational transform is then applied to rotate each frame through an angle determined from the mis-alignment between the axis "V" and the axis "U", as defined by the real vertical axis "G" as projected onto the image plane of the camera. The thus transformed image frames are then output in sequence to the frame memory 40 and on to the output stage 42. The correction angle is thus determined responsive to reference data of axial camera alignment in real space obtained contemporaneously with the frame concerned.

Figure 1:
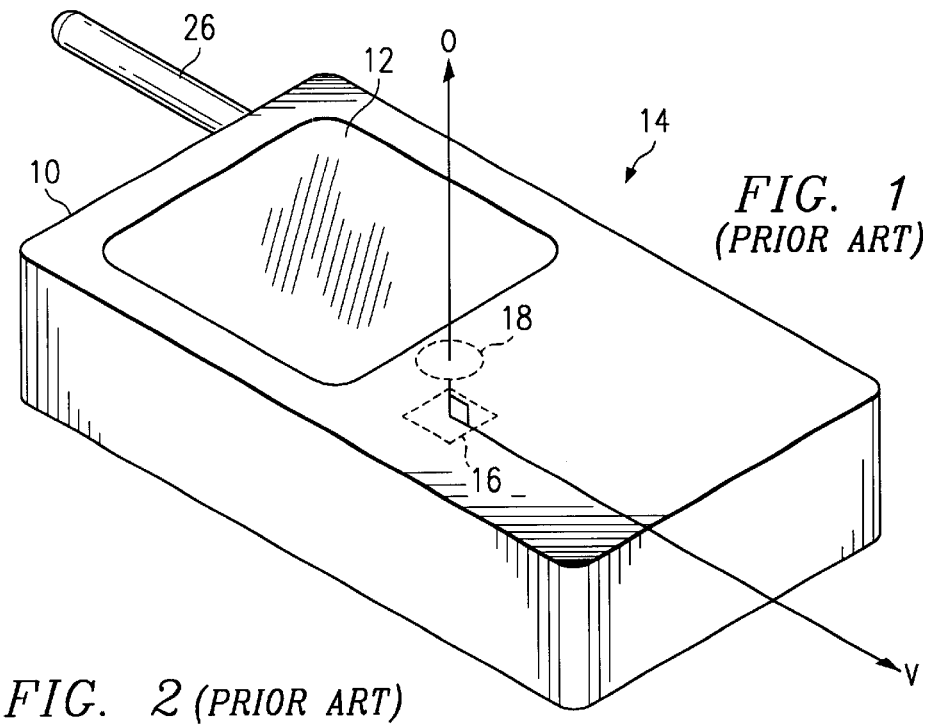
FIG. 1 is a perspective view of a previously proposed video telephone in the form of a hand-held terminal comprising a display and in-built camera.
Figure 2:
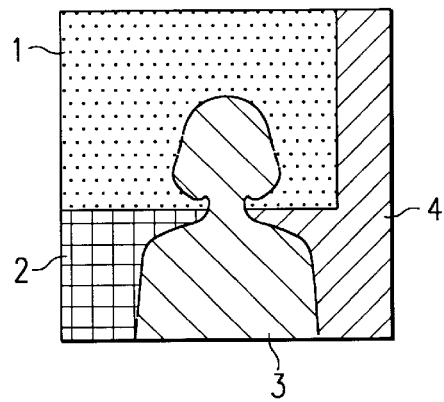
FIG. 2 shows an image taken with the in-built camera of a hand-held terminal as shown in FIG. 1 presented on the display of another hand-held terminal during a video telephone call.
Figure 3:
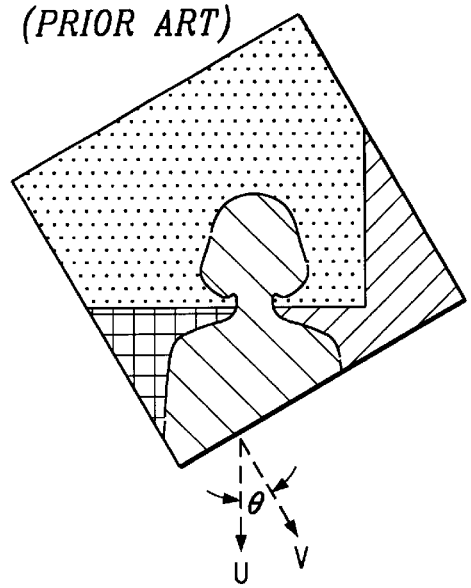
FIG. 3 shows an image corresponding to that of FIG. 1 as recorded by the in-built camera of one hand-held terminal after rotation of that terminal about an optical axis of its camera by an angle θ.
Figure 4:
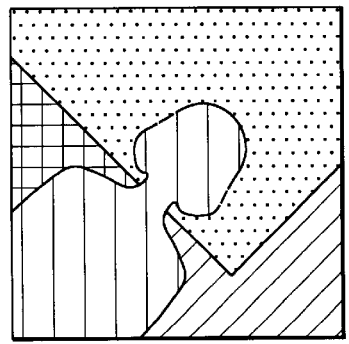
FIG. 4 shows the image of FIG. 3 as projected on the display of a receiving hand-held terminal with the image vertically mis-aligned as a result of the mis-alignment of the transmitting hand-held terminal.

In an alternative embodiment, the sensor 20 is omitted. The digital signal processor is then configured to apply standard image processing techniques to compute the vertical alignment axis "U" of each frame. The mis-alignment angle is thus determined from an analysis of the image content of the frames themselves. One technique is to identify mutually perpendicular straight lines that intersect between data objects in the image. These can then be classified into vertical and horizontal lines from which the alignment axis "U" can be deduced. Referring to the image shown in FIG. 2, such lines appear at the border between data objects 1 & 2, and 1 & 4. An advantage of this technique is that the orientation of objects can be identified using contrast techniques to isolate the boundaries of the object. If an object is irregular in shape the DSP can be configured so as to perform no alignment correction. For example, a sequence of images of a dropping flower can be processed by making no alignment correction, since no straight alignment lines are identified.

In summary, vertical mis-alignment in the image frames taken by a moving camera can be corrected for prior to output, either using a reference axis obtained from sensor data collated from a sensor mounted in fixed relation to the camera, or through an image processing analysis of the data content of the image frames.

A further alternative is instead to defer rotational transformation of the image frames until immediately prior to supply to the display 12. This alternative is now described with reference to FIG. 8.

Figure 8:
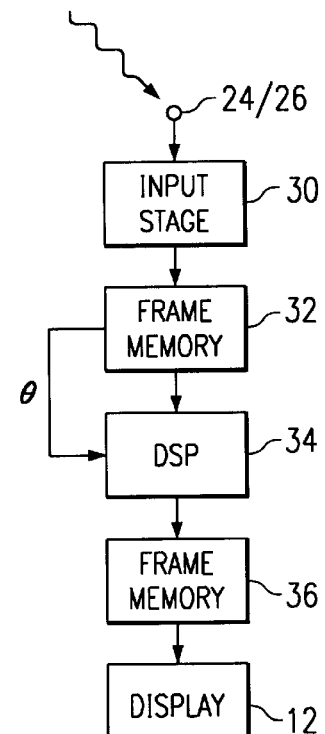
FIG. 8 is a block diagram showing internal structure of the video telephone of FIG. 5 as an alternative to that of FIG. 6.

FIG. 8 illustrates internal structure of a hand-held terminal as shown in FIG. 5. Image frames are received in sequence at the antenna 26, or from the input socket 24 through the electrical or optical communication line 21. The input stage 30 supplies the image data into a first frame memory 32. In this embodiment, the image data not only includes the pixel data but also includes a rotational angle which is the angle taken by the sensor 20 in the transmitting device. A DSP 34 is then arranged to apply a rotational transform to its image frame prior to supply to the display. More specifically, the DSP 34 reads the rotational angle θ for an image frame from the frame memory 32 and then applies the transform rotating through that angle θ on the pixel data for that frame which is then read from the first frame memory 32 and, after transformation, written to the second frame memory 36 from which the image data corrected for vertical misalignment is supplied to the display 12.

In a variant of the embodiment of FIG. 8, the DSP 34 determines the rotational angle itself from an analysis of the image content of the frames held in the first frame memory 32, in which case no rotational angle needs to be supplied with the signal input from the antenna 26 or input socket 24. This variant will be understood by analogy to the above-described variant of FIG. 6 in which the sensor 20 is dispensed with.

Figure 9:
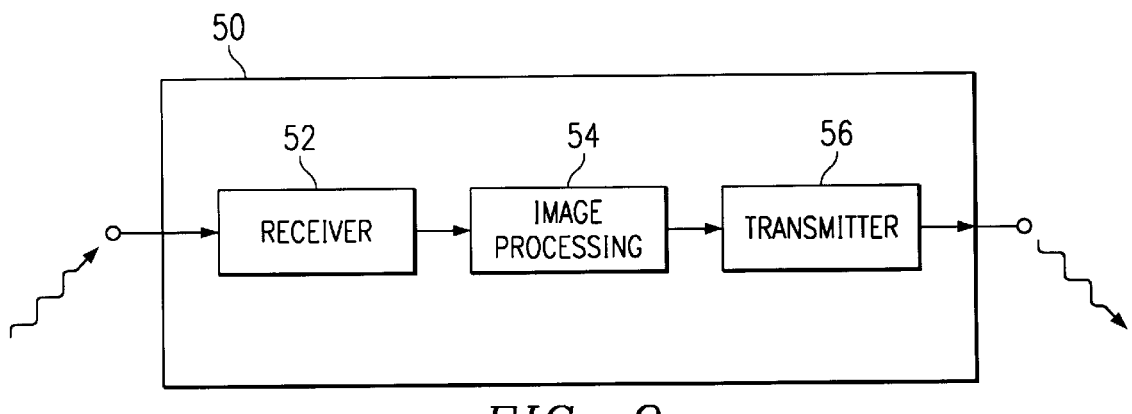
FIG. 9 is a block diagram of a base station for wireless communication between video telephones, the base station having an image processing apparatus for correcting for vertical mis-alignment in the relayed images.

FIG. 9 shows a further embodiment of the invention in the form of a base station 50 comprising a receiver 52, image processor 54 and transmitter 56. The base station is of the kind provided for relaying wireless communications between transceiver devices such as hand-held video telephones. The receiver 52 and transmitter 56 are conventional components, but the image processing apparatus 54 is operable to perform automatic correction for vertical misalignment in the image frames. The image processing apparatus 54 includes a digital signal processor operable to determine a vertical alignment axis for each frame of the video sequence from an analysis of the data content of that frame, as described further above with reference to the preceding embodiments. A rotational transform is applied to each frame to map the vertical alignment axis determined by the analysis on to a fixed alignment axis for that frame. The frames, transformed to compensate for vertical misalignment of the data content, are then output to the transmitter 56. With this embodiment, there is the advantage that standard hand-held terminal devices can be used, since the image processing is performed centrally at the base station. Terminal equipment costs can therefore be reduced and more numerically intensive image processing techniques can be used, since a larger computing resource can be employed in the base station than is possible in the terminal devices.

Further embodiments of the invention may include an image processing apparatus as described with reference to FIG. 9 in any apparatus used to record, display or process sequences of image frames, thereby to compensate for vertical mis-alignment of image content prior to transmission, recording or display of a sequence of image frames.

One example of a display apparatus is a video player, which may additionally have a recording capability and thus be a combined display and recording apparatus.

One example of a recording apparatus is a semi-professional or professional type video camera. Conventionally, a professional cameraman achieves vertical alignment manually by looking through the viewfinder. Moreover, once vertically aligned manually, picture orientation is maintained by a mechanical gyroscope system held by the cameraman in which the video camera is suspended. A video camera could be provided with an image processing apparatus as described with reference to FIG. 9 which serves to analyze and correct the vertical alignment only within a relatively small angular range, for example up to five degrees from vertical, based on the assumption that approximate vertical alignment will have already been achieved manually by the cameraman. Alternatively, the alignment correction could be activated over a larger range of angles and the mechanical gyroscope support dispensed with.

What is claimed is:

1. An image processing apparatus, comprising:
   a digital signal processor for processing a sequence of image frames collectively forming a motion picture, wherein the digital signal processor is arranged to:
   determine a vertical alignment axis for each frame of the sequence from an analysis of the data content of that frame, wherein the analysis includes the digital signal processor arranged to:
   identify perpendicular lines between data objects in the frame; and
   evaluate the intersection of the perpendicular lines to determine the vertical alignment axis in the frame;
   apply a rotational transform to each frame to map the vertical alignment axis determined by the analysis onto a fixed alignment axis of the frame; and
   output the sequence of image frames thus transformed to compensate for vertical misalignment of the data content of the frames.

2. An image processing apparatus according to claim 1, further comprising:
   (a) a housing shaped and dimensioned to allow the device to be hand held;
   (b) a camera arranged in the housing so as to define an optical axis extending away from the housing, the camera including a detector comprising an array of light sensitive elements for obtaining respective pixels of an image frame and an output of an electronic signal corresponding to plural image frames; and
   (c) the digital signal processor arranged in the housing and operatively connected on the output of the camera to apply rotational transformations to frames obtained by the camera, thereby to compensate for vertical misalignment of the data content of the frames.

3. An image processing apparatus according to claim 2, further comprising:
   (d) a drive for removably receiving a data carrier which, when loaded in the drive, is in operative communication with the digital signal processor to allow storage of the sequence of image frames after transformation to compensate for vertical misalignment of the data content of the frames.

4. An image processing apparatus according to claim 2, further comprising:
   (d) a data carrier arranged in operative communication with the digital signal processor to allow storage of the sequence of image frames after transformation to compensate for vertical misalignment of the data content of the frames; and (e) an output connected to the data carrier to allow sequences of image frames stored in the data carrier to be output from the device.

5. An image processing apparatus according to claim 1, further comprising:

(a) an input stage for receiving image frames;

(b) a display connected to the input stage so as to display image frames received by the input stage as a motion picture; and (c) the digital signal processor operatively connected between the input stage and the display, thereby to output to the display a sequence of image frames transformed to compensate for vertical misalignment of the data content of the frames received at the input stage.

6. An image processing apparatus according to claim 1, further comprising:

a receiver for receiving sequences of image frames;

the digital signal processor arranged to receive sequences of image frames from the receiver; and a transmitter for outputting a sequence of image frames transformed by the image processing apparatus to compensate for vertical misalignment of the data content of the frames received at the input stage.

7. An image processing method, comprising:

receiving a sequence of image frames taken by a camera;

determining a vertical alignment axis for each frame of the sequence from an analysis of data content of that frame, the analysis comprising:

identifying perpendicular lines between data objects in the frame; and evaluating the intersection of the perpendicular lines to determine the vertical alignment axis in the frame;

applying a rotational transform to each frame through an angle determined from misalignment between the vertical alignment axis and a fixed alignment axis of the frame; and outputting the sequence of image frames thus transformed to compensate for vertical misalignment of the image content of the frames.

8. A method according to claim 7, wherein the perpendicular lines are identified by using a contrast technique to isolate boundaries of the data objects.

* * * * *